US012453526B2

(12) United States Patent
Ohgami et al.

(10) Patent No.: US 12,453,526 B2
(45) Date of Patent: Oct. 28, 2025

(54) WHEEZE DETECTION APPARATUS, WHEEZE DETECTION METHOD, AND WHEEZE DETECTION PROGRAM

(71) Applicant: OMRON HEALTHCARE CO., LTD., Muko (JP)

(72) Inventors: Naoto Ohgami, Kyoto (JP); Kei Asai, Kyoto (JP); Kenji Hashino, Kyoto (JP); Naoki Matsumoto, Kyoto (JP); Chizu Habukawa, Wakayama (JP); Katsumi Murakami, Osaka (JP)

(73) Assignee: OMRON HEALTHCARE CO., LTD., Kyoto (JP)

( * ) Notice: Subject to any disclaimer, the term of this patent is extended or adjusted under 35 U.S.C. 154(b) by 1025 days.

(21) Appl. No.: 17/198,457

(22) Filed: Mar. 11, 2021

(65) Prior Publication Data
US 2021/0196226 A1 Jul. 1, 2021

Related U.S. Application Data

(63) Continuation of application No. PCT/JP2019/032893, filed on Aug. 22, 2019.

(30) Foreign Application Priority Data

Sep. 12, 2018 (JP) ................. 2018-170805

(51) Int. Cl.
*A61B 7/00* (2006.01)
*A61B 5/00* (2006.01)
*A61B 7/04* (2006.01)

(52) U.S. Cl.
CPC ............ *A61B 7/003* (2013.01); *A61B 5/7203* (2013.01); *A61B 7/04* (2013.01)

(58) Field of Classification Search
CPC .......... A61B 5/7203; A61B 7/003; A61B 7/04
See application file for complete search history.

(56) References Cited

U.S. PATENT DOCUMENTS

2008/0013747 A1\* 1/2008 Tran ..................... A61B 5/0295
381/67
2011/0125044 A1 5/2011 Rhee et al.
(Continued)

FOREIGN PATENT DOCUMENTS

CN 102781318 A 11/2012
CN 107252319 A \* 10/2017 ............... A61B 7/04
(Continued)

OTHER PUBLICATIONS

Pan, Jiapu, and Willis J. Tompkins. "A real-time QRS detection algorithm." IEEE transactions on biomedical engineering 3 (1985): 230-236. (Year: 1985).\*
(Continued)

*Primary Examiner* — Jennifer Robertson
*Assistant Examiner* — Om Patel
(74) *Attorney, Agent, or Firm* — Keating & Bennett, LLP

(57) ABSTRACT

There is provided a wheeze detection apparatus including: a sound measurer configured to measure a pulmonary sound of a measurement subject; a respiratory sound volume deriver configured to derive a respiratory sound volume of the measurement subject based on the sound measured by the sound measurer; and a wheeze detector configured to extract a maximum point from an intensity distribution for each frequency of the sound and to detect wheeze based on information on the maximum point. The wheeze detector sets, in a case where the respiratory sound volume is outside a predetermined range, detection sensitivity of the wheeze to a higher value than the detection sensitivity in a case where the respiratory sound volume is within the range.

11 Claims, 7 Drawing Sheets

(56) References Cited

U.S. PATENT DOCUMENTS

| | | |
|---|---|---|
| 2011/0230777 A1 | 9/2011 | Fu |
| 2013/0259240 A1 | 10/2013 | Chang |
| 2015/0209000 A1 | 7/2015 | Endo et al. |
| 2017/0135649 A1* | 5/2017 | Kametani ................ A61B 7/04 |
| 2017/0325777 A1* | 11/2017 | Asai ..................... A61B 5/6833 |
| 2018/0208454 A1* | 7/2018 | Hoekstra ............. H04R 23/008 |

FOREIGN PATENT DOCUMENTS

| | | | |
|---|---|---|---|
| JP | 2012-085906 A | | 5/2012 |
| JP | 2014-061223 A | | 4/2014 |
| JP | 2016-158806 A | | 9/2016 |
| JP | 2017-099916 A | | 6/2017 |
| WO | WO 9103981 | * | 4/1991 |
| WO | 2007/118560 A2 | | 10/2007 |
| WO | 2015/011923 A1 | | 1/2015 |

OTHER PUBLICATIONS

Machine Translation of CN-107252319-A, Patent Translate, pp. 1-9, printed on Aug. 23, 2025 (Year: 2017).*
Official Communication issued in corresponding Chinese Patent Application No. 201980059159.1, mailed on Dec. 15, 2021.
Li et al., "Spectrum Feature Extraction and Signal Detection of Wheeze in Time-frequency domain", Journal of Signal Processing vol. 29 No. 4, Apr. 30, 2013, 7 pages.
Official Communication issued in International Patent Application No. PCT/JP2019/032893, mailed on Nov. 12, 2019.

* cited by examiner

WHEEZE DETECTION APPARATUS, WHEEZE DETECTION METHOD, AND WHEEZE DETECTION PROGRAM

CROSS-REFERENCE TO RELATED APPLICATIONS

This application is a continuation of PCT application No. PCT/JP2019/032893, which was filed on Aug. 22, 2019 based on Japanese Patent Application No. 2018-170805 filed on Sep. 12, 2018, the contents of which are incorporated herein by way of reference.

BACKGROUND

The present invention relates to a wheeze detection apparatus, a wheeze detection method, and a wheeze detection program.

There has been known a device capable of extracting a pulmonary sound as an electric signal using a microphone (see, for example, Patent Literature 1 and Patent Literature 2). The pulmonary sounds are all sounds that are generated with a respiratory motion in a lung and a thorax, regardless of whether being normal or abnormal, except for a sound originating from a cardiovascular system. The pulmonary sound is classified into a respiratory sound which is a physiological sound originating from an air flow generated in an airway due to respiration, and an adventitious sound which is an abnormal sound generated in a pathological condition, such as wheeze or pleural friction rub.

Patent Literature 1 describes a biological sound inspection device capable of obtaining an index value appropriately reflecting an airway state. The biological sound inspection device calculates band power within a predetermined section for a plurality of frequency bands of a biological sound, sets an average value of power in a wide band as reference power, and corrects power in a specific band based on the reference power to obtain an index value reflecting the airway state.

Patent Literature 2 describes that measurement result information suitable for the purpose of measurement is derived by storing several algorithms (algorithms for processing a biological parameter) according to attribute information (an attachment position, a measurement site, a measurement item) of a biological sensor including one type of sound sensor.

Patent Literature 1: JP-A-2017-99916
Patent Literature 2: JP-A-2012-85906

The wheeze as the adventitious sound that may be heard during an asthma attack, occurs in synchronization with the respiratory sound. Therefore, when the wheeze is detected, the respiratory sound becomes noise, which is a factor that makes it difficult to detect the wheeze.

Volume of respiratory sound and wheeze depends on a body shape of a measurement subject such as a height, a body weight, a body mass index (BIM), a diameter or hardness of the airway of the measurement subject, or the like. In particular, in a case where the body weight or BMI is large, the respiratory sound and wheeze are less likely to be transmitted to a body surface, and therefore the respiratory sound and wheeze are also small, making detection difficult.

When an asthma attack becomes severe, breathing becomes rough, and therefore the respiratory sound volume increases, making it difficult to detect the wheeze. Further, when the asthma attack becomes severe enough to cause respiratory failure, breathing becomes shallow and small, and therefore the respiratory sound and wheeze also become small, making it difficult to detect the wheeze.

Patent Literature 1 discloses that the index value reflecting the airway state is corrected based on the sound volume, but it is unknown whether the wheeze can be detected in a case where the respiratory sound volume is small or large.

Patent Literature 2 describes that the measurement result information suitable for the purpose of measurement is derived by storing several algorithms, but selection of the algorithm is not based on the respiratory sound volume.

The present invention has been made in view of the above circumstances, and an object of the present invention is to provide a wheeze detection apparatus, a wheeze detection method, and a wheeze detection program capable of easily detecting wheeze during a severe asthma attack, or wheeze of a person having a large body weight, a large BMI, or the like.

SUMMARY

According to one aspect of the present invention, there is provided a wheeze detection apparatus including: a sound measurer configured to measure a pulmonary sound of a measurement subject; a respiratory sound volume deriver configured to derive a respiratory sound volume of the measurement subject based on the sound measured by the sound measurer; and a wheeze detector configured to extract a maximum point from an intensity distribution for each frequency of the sound and to detect wheeze based on information on the maximum point. The wheeze detector sets, in a case where the respiratory sound volume is outside a predetermined range, detection sensitivity of the wheeze to a higher value than the detection sensitivity in a case where the respiratory sound volume is within the range.

According to other aspect of the present invention, the wheeze detector sets, in a case where the respiratory sound volume is larger than the range, the detection sensitivity to a higher value than the detection sensitivity in the case where the respiratory sound volume is within the range.

According to other aspect of the present invention, the wheeze detector sets, in a case where the respiratory sound volume is smaller than the range, the detection sensitivity to a higher value than the detection sensitivity in the case where the respiratory sound volume is within the range.

According to other aspect of the present invention, the wheeze detector sets, in a case where the respiratory sound volume is smaller than the range, the detection sensitivity to a higher value than the detection sensitivity in the case where the respiratory sound volume is within the range, and further sets the detection sensitivity to a value different between the case where the respiratory sound volume is smaller than the range and the case where the respiratory sound volume is larger than the range.

According to other aspect of the present invention, the wheeze detector extracts the maximum point having an intensity exceeding a predetermined threshold value from the intensity distribution, detects the wheeze based on the information of the maximum point, and increases the detection sensitivity of the wheeze by decreasing the threshold value.

According to other aspect of the present invention, there is provided a wheeze detection method for detecting wheeze of a measurement subject including: a respiratory sound volume deriving step of deriving a respiratory sound volume of the measurement subject based on a sound measured by a sound measurer configured to measure a pulmonary sound of the measurement subject; and a wheeze detecting step of extracting a maximum point from an intensity distribution for each frequency of the sound and detecting wheeze based on information on the maximum point. In the wheeze detecting step, in a case where the respiratory sound volume is outside a predetermined range, detection sensitivity of the wheeze is set to a higher value than the detection sensitivity in a case where the respiratory sound volume is within the range.

According to other aspect of the present invention, there is provided a memory which stores wheeze detection program configured to detect wheeze of a measurement subject, the program that causes a computer to execute: a respiratory sound volume deriving step of deriving a respiratory sound volume of the measurement subject based on a sound measured by a sound measurer configured to measure a pulmonary sound of the measurement subject; and a wheeze detecting step of extracting a maximum point from an intensity distribution for each frequency of the sound and detecting wheeze based on information on the maximum point. In the wheeze detecting step, in a case where the respiratory sound volume is outside a predetermined range, detection sensitivity of the wheeze is set to a higher value than the detection sensitivity in a case where the respiratory sound volume is within the range.

DESCRIPTION OF EMBODIMENTS

Outline of Wheeze Detection Apparatus according to Embodiment

First, an outline of an embodiment of a wheeze detection apparatus according to the present invention will be described. The wheeze detection apparatus according to the embodiment measures a pulmonary sound from a human body, and in a case where it is determined that wheeze is included in a measurement sound, notifies the fact. In this way, support is given in determination of whether a measurement subject is needed to be administered, determination of whether to take the measurement subject to the hospital, or the like.

The wheeze detection apparatus according to the embodiment derives a respiratory sound volume of the measurement subject based on the sound measured by a sound measurer for measuring the pulmonary sound, and further determines the presence or absence of the wheeze based on a maximum point having an intensity exceeding a predetermined threshold value among maximum points in an intensity distribution for each frequency of the sound. In the determination of the presence or absence of wheeze, in a case where the derived respiratory sound volume is outside the predetermined range, the wheeze detection apparatus sets the threshold to a smaller value than the threshold in a case where the respiratory sound volume is within the range.

According to such an operation, in a case where the respiratory sound volume is large, for example, the threshold value is set to be lower than that in the case where the respiratory sound volume is within the above range. Accordingly, it is possible to increase the number of the maximum points described above used in the determination of the presence or absence of the wheeze, and it is possible to increase a possibility that wheeze is determined to be present (in other words, to increase a detection sensitivity of the wheeze). Accordingly, it is possible to make it easier to detect wheeze even in a state where breathing becomes rough.

In addition, for example, in a case where the respiratory sound volume is small, the threshold value is set to be lower than that in the case where the respiratory sound volume is within the above range. As a result, it is possible to increase the number of the maximum points used in the determination of the presence or absence of the wheeze, and it is possible to increase the possibility that the wheeze is determined to be present (in other words, to increase the detection sensitivity of the wheeze). Accordingly, it is possible to make it easier to detect the wheeze even in a state where breathing becomes shallow and small, such as a measurement subject who has caused a severe asthma attack or a measurement subject who has a large body weight or BMI.

Hereinafter, a specific configuration example of the wheeze detection apparatus according to the embodiment will be described.

Embodiment

Figure 1:
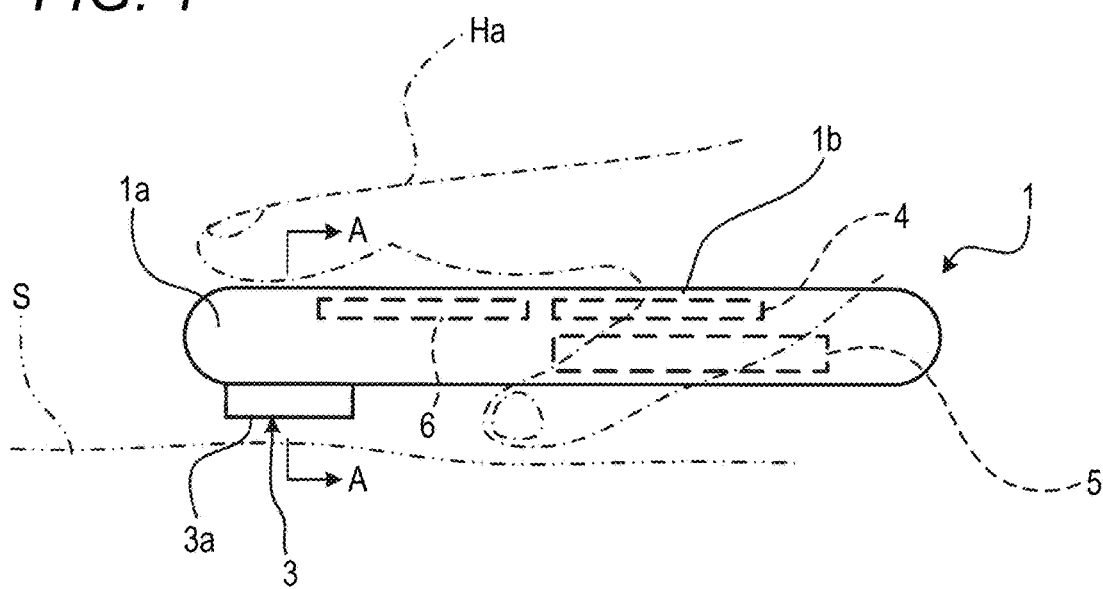
FIG. 1 is a side view showing a schematic configuration example of a wheeze detection apparatus 1 that is an embodiment of a wheeze detection apparatus according to the present invention.

FIG. 1 is a side view showing a schematic configuration example of a wheeze detection apparatus 1 that is an embodiment of a wheeze detection apparatus according to the present invention. As shown in FIG. 1, the wheeze detection apparatus 1 includes a rod-shaped grip portion 1b configured by a housing made of a resin, a metal, or the like, and a head portion 1a is provided on one end side of the grip portion 1b.

Inside the grip portion 1b, an integrated control unit 4 that integrally controls the whole wheeze detection apparatus 1, a battery 5 that supplies a voltage required for operation, and a display unit 6 that displays an image using a liquid crystal display panel, an organic electro luminescence (EL) display panel, or the like are provided.

The integrated control unit 4 includes various processors, a random access memory (RAM), a read only memory (ROM), and the like, and performs a control of each piece of hardware of the wheeze detection apparatus 1 in accordance with a program. In the ROM of the integrated control unit 4, programs including a wheeze detection program are stored.

The various processors include a central processing unit (CPU) that is a general-purpose processor that executes programs to perform various processings, a programmable logic device (PLD) that is a processor whose circuit configuration can be changed after manufacture such as an field programmable gate array (FPGA) or the like, a dedicated electric circuit that is a processor having a circuit configuration specifically designed for executing a specific processing such as an application specific integrated circuit (ASIC) or the like, and the like. More specifically, structures of these various processors are electric circuits in which circuit elements such as semiconductor elements are combined.

The integrated control unit 4 may be configured with one of the various processors, or may be configured with a combination of two or more processors of the same type or different types (for example, a combination of a plurality of FPGAs or a combination of a CPU and an FPGA).

The head portion 1a is provided with a measurer 3 protruding toward one side (a lower side in FIG. 1) in a direction substantially orthogonal to a long side direction of the grip portion 1b. At a tip end of the measurer 3, a pressure receiving portion 3a that comes into contact with a body surface S of a living body which is the measurement subject and that receives a pressure from the body surface S, is provided.

The wheeze detection apparatus 1 is used by the pressure receiving portion 3a of the measurer 3 being pressed against the body surface S by an index finger of a user, for example, in a state in which the index finger of a hand Ha of the user is placed on a back surface of the measurer 3 in the head portion 1a.

Figure 2:
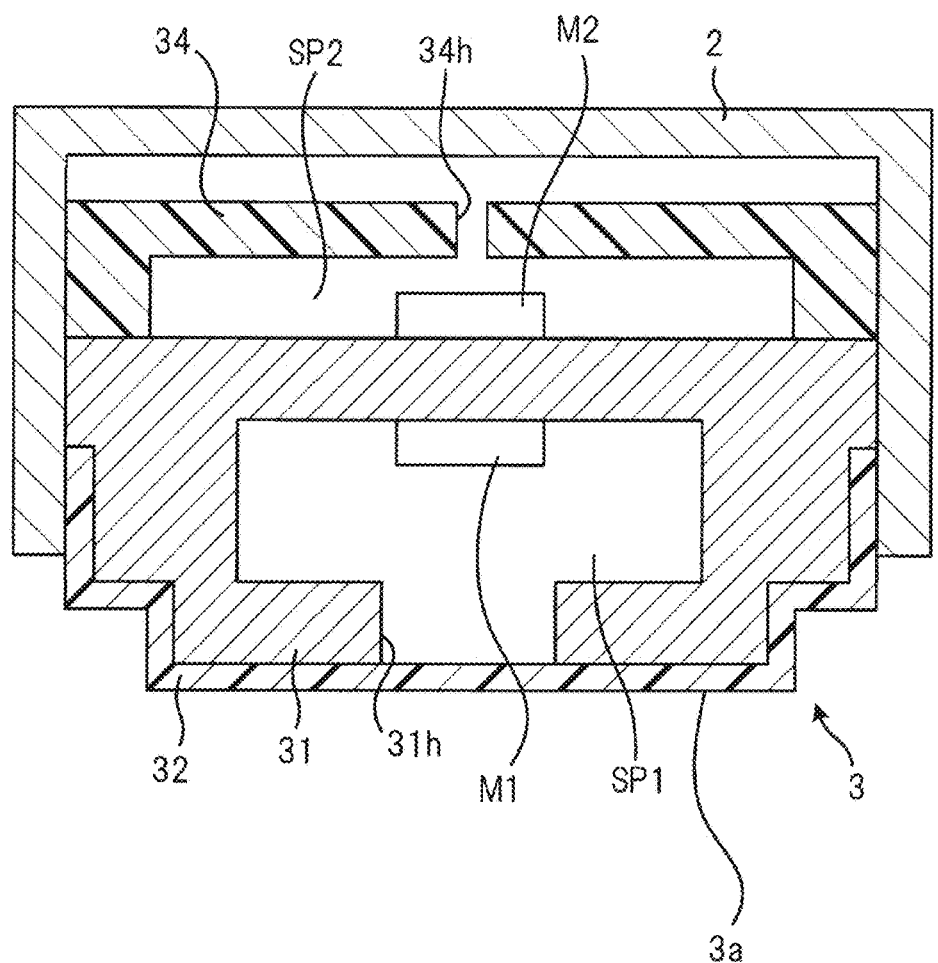
FIG. 2 is a schematic sectional view taken along a line A-A in the wheeze detection apparatus 1 shown in FIG. 1.

FIG. 2 is a schematic sectional view taken along a line A-A in the wheeze detection apparatus 1 shown in FIG. 1.

As shown in FIG. 2, the measurer 3 includes a first sound measuring instrument M1 that measures a sound, a bottomed cylindrical first housing 31 that accommodates the first sound measuring instrument M1 in an internal accommodation space SP1 and that has an opening 31h closed by the body surface S in a state of being pressed against the body surface S of the living body, a housing cover 32 that closes the opening 31h from an outer side of the first housing 31 and that covers the first housing 31, a second sound measuring instrument M2 that measures a sound, and a second housing 34 that forms an accommodation space SP2 for accommodating the second sound measuring instrument M2 and that has an opening 34h.

The measurer 3 is fixed to a housing 2 by being fitted into an opening portion formed in the housing 2 constituting the head portion 1a, with a part of the housing cover 32 being exposed.

A tip end portion of a portion of the housing cover 32 exposed from the housing 2 is a flat surface or a curved surface, and the flat surface or the curved surface constitutes the pressure receiving portion 3a. The housing 2 is made of a resin or the like that can transmit a sound.

The first sound measuring instrument M1 is configured to measure a pulmonary sound, and is configured by, for example, a micro electro mechanical systems (MEMS) microphone or a capacitive microphone that measures a sound in a frequency band (for example, a frequency range of 10 Hz or more and 10 kHz or less) wider than a frequency range of the pulmonary sound (generally, 10 Hz or more and 1 kHz or less). The first sound measuring instrument M1 functions as a sound measurer.

The first sound measuring instrument M1 is electrically connected to the integrated control unit 4 shown in FIG. 1 by a lead wire or the like (not shown). A signal of a sound measured by the first sound measuring instrument M1 (hereinafter, referred to as a pulmonary sound signal) is transmitted to the integrated control unit 4.

When the wheeze detection apparatus 1 is used, the pressure receiving portion 3a of the housing cover 32 comes into contact with the body surface S, and due to a pressure from the body surface S, the accommodation space SP1 is brought into a state of being sealed by the body surface S via the housing cover 32 (hereinafter, this state is referred to as a sealed state).

When the pressure receiving portion 3a vibrates due to the pulmonary sound transmitted from the living body to the body surface S, an internal pressure of the accommodation space SP1 fluctuates due to the vibration, and an electrical signal corresponding to the pulmonary sound is measured by the first sound measuring instrument M1 due to the fluctuation in the internal pressure.

The first housing 31 has a substantially convex shape facing downward in FIG. 2, and is made of a material having higher acoustic impedance than air and high rigidity, such as a resin or a metal. The first housing 31 is made of a material that reflects a sound in a measurement frequency band of the first sound measuring instrument M1 so that the sound is not transmitted from the outside to the inside of the accommodation space SP1 in the sealed state.

The housing cover 32 is a bottomed cylindrical member, and a shape of a hollow portion thereof substantially coincides with a shape of an outer wall of the first housing 31.

The housing cover 32 is made of a flexible material having acoustic impedance close to that of a human body, air, or water and having good biocompatibility. As the material of the housing cover 32, for example, silicone, elastomer, or the like is used.

The second sound measuring instrument M2 is configured to measure a sound around the first housing 31 (an environmental sound such as a human voice, a rubbing sound between a device and a living body or clothing, or the like), and is configured by, for example, a MEMS microphone or a capacitive microphone that measures a sound in a frequency band (for example, a frequency range of 10 Hz or more and 10 kHz or less) wider than the frequency band of the pulmonary sound.

The second sound measuring instrument M2 is electrically connected to the integrated control unit 4 shown in FIG. 1 by a lead wire or the like (not shown). A signal of a sound measured by the second sound measuring instrument M2 (hereinafter, referred to as an ambient sound signal) is transmitted to the integrated control unit 4.

The second sound measuring instrument M2 is fixed to a surface of the first housing 31 on a side opposite to the pressure receiving portion 3a side. A periphery of the second sound measuring instrument M2 is covered with the second housing 34. The second housing 34 is made of a material (for example, a resin) that allows a sound generated around the wheeze detection apparatus 1 to easily enter the accommodation space SP2 accommodating the second sound measuring instrument M2.

An opening 34h is formed in the second housing 34. As a result, a structure is formed in which the sound generated around the wheeze detection apparatus 1 easily enters through the opening 34h.

Figure 3:
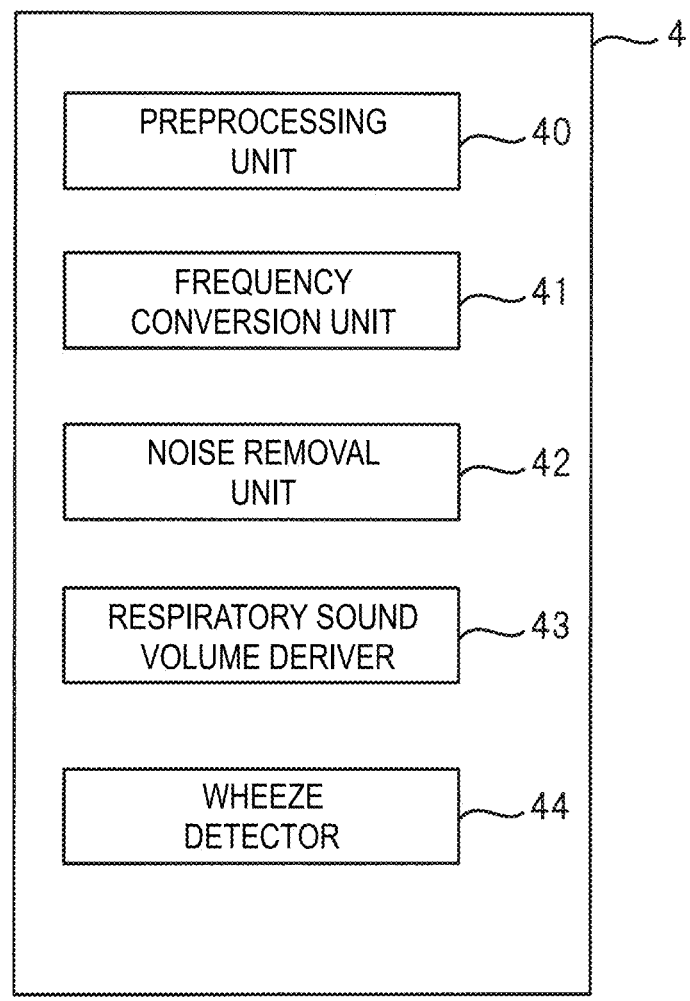
FIG. 3 is a functional block diagram of an integrated control unit 4 shown in FIG. 1.

FIG. 3 is a functional block diagram of the integrated control unit 4 shown in FIG. 1. The processor of the integrated control unit 4 functions as a preprocessing unit 40, a frequency conversion unit 41, a noise removal unit 42, a respiratory sound volume deriver 43, and a wheeze detector 44 by executing the wheeze detection program.

The preprocessing unit 40 performs a preprocessing in which when the pulmonary sound signal measured by the first sound measuring instrument M1 and the ambient sound signal measured by the second sound measuring instrument M2 are acquired, a signal in a specific frequency range (for example, a frequency range of 5 kHz or less, which is considered to be an upper limit value of a frequency at which the wheeze can be present) is extracted from each of the pulmonary sound signal and the ambient sound signal and the extracted signal is amplified.

Specifically, the preprocessing unit 40 performs a high-pass filter processing, a low-pass filter processing, or the like on each of the pulmonary sound signal and the ambient sound signal to extract the signal in the specific frequency range. The pulmonary sound signal and the ambient sound signal preprocessed by the preprocessing unit 40 are stored in the RAM of the integrated control unit 4.

The frequency conversion unit 41 performs frequency conversion (for example, fast Fourier transform) on the pulmonary sound signal and the ambient sound signal (also referred to as frame data) after the preprocessing, which are measured in the same period (a period of a predetermined length (for example, several hundreds of milliseconds), and hereinafter referred to as a frame period).

Figure 4:
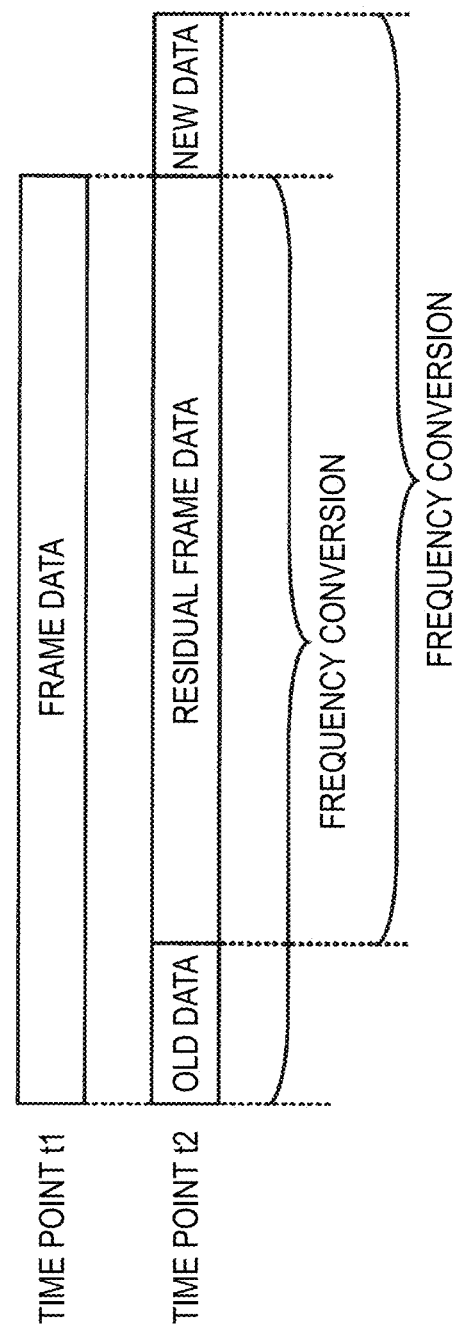
FIG. 4 is a schematic view showing a processing of a frequency conversion unit 41.

As shown in FIG. 4, after performing the fast Fourier transform on the frame data at a time point t1, when the pulmonary sound signal and the ambient sound signal ("new data" in the figure) after the preprocessing for a predetermined period (for example, several tens of milliseconds) shorter than the frame period are newly stored in the RAM at a time point t2, the frequency conversion unit 41 resets the frame period by advancing a start time and an end time of the frame period by a length of the predetermined period described above, sets the pulmonary sound signal and the ambient sound signal (a combination of residual frame data and the new data in the figure) in the reset frame period as new frame data, and performs the fast Fourier transform on the new frame data.

Figure 5:
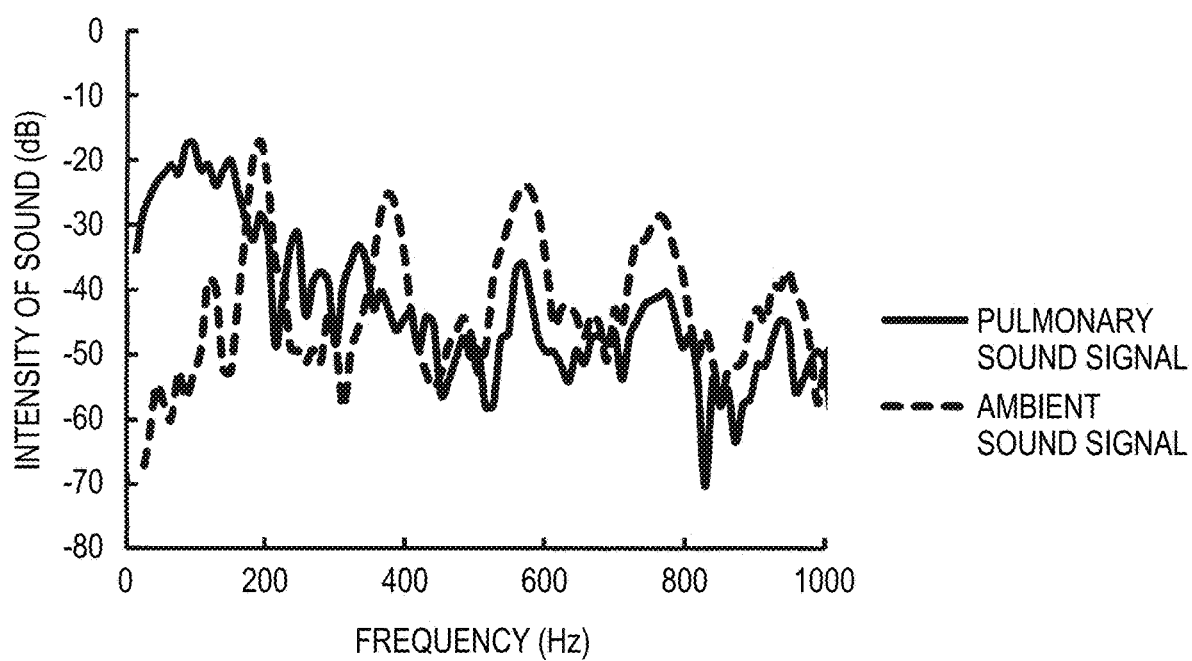
FIG. 5 is a view showing an example of frame data after fast Fourier transform by the frequency conversion unit 41.

As described above, the frequency conversion unit 41 performs frequency conversion of the frame data while sequentially shifting the frame period. FIG. 5 is a view showing an example of the frame data after the fast Fourier transform by the frequency conversion unit 41. In FIG. 5, a vertical axis represents a sound pressure level (unit is decibel (dB)).

Figure 6:
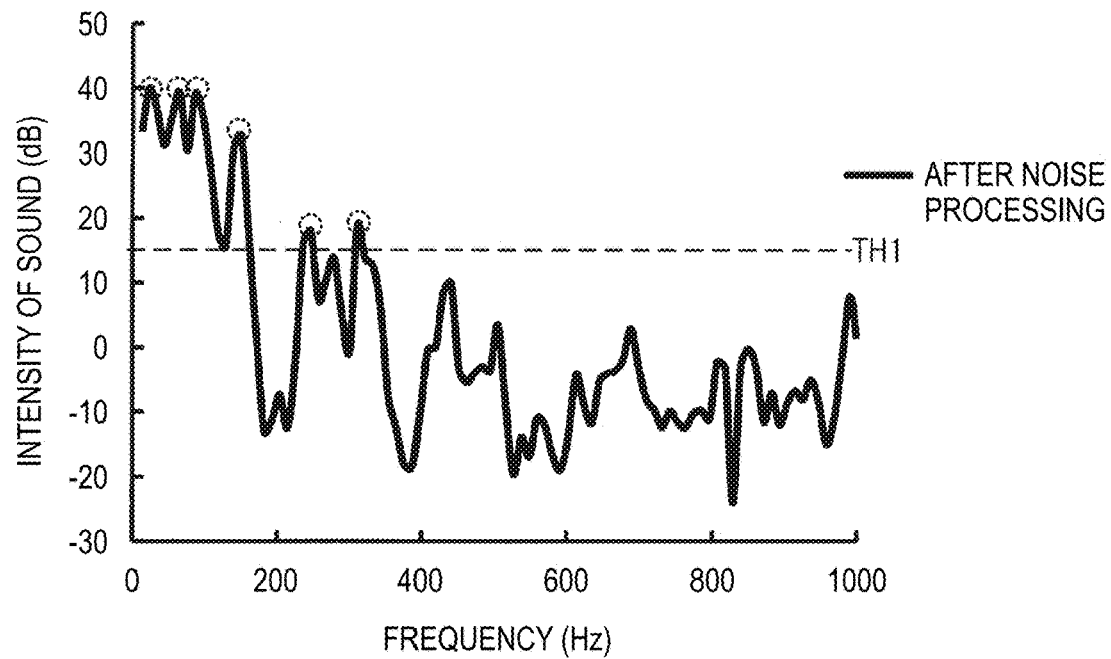
FIG. 6 is a view showing an intensity distribution for each frequency of a pulmonary sound signal obtained by removing a noise component from the pulmonary sound signal shown in FIG. 5.

The noise removal unit 42 removes a noise component other than a pulmonary sound component included in the pulmonary sound signal of the frame data based on each piece of frame data after the fast Fourier transform as shown in FIG. 5. FIG. 6 is a view showing an intensity distribution for each frequency of the pulmonary sound signal obtained by removing the noise component based on the ambient sound signal shown in FIG. 5, from the pulmonary sound signal shown in FIG. 5.

The respiratory sound volume deriver 43 derives a respiratory sound volume of the measurement subject in the frame period based on the pulmonary sound signal in each frame period in which the noise component has been removed by the noise removal unit 42. For example, the respiratory sound volume deriver 43 calculates a root mean square (RMS) amplitude of the pulmonary sound signal in the frame period after noise removal, and derives the RMS amplitude as the respiratory sound volume of the measurement subject in the frame period.

The wheeze detector 44 extracts a maximum point from the pulmonary sound signal (for example, a graph shown in FIG. 6) of each frame period in which the noise component has been removed by the noise removal unit 42 according to a predetermined extraction condition, and stores information on the extracted maximum point (at least one of the frequency and a sound intensity) in the RAM in association with each frame period. Then, the wheeze detector 44 detects the wheeze by determining the presence or absence of the wheeze based on the information on the maximum points stored in the RAM.

The extraction condition described above is, for example, a condition for extracting a maximum point in the pulmonary sound signal in a range of intensities exceeding a predetermined threshold value. For example, in a case where a threshold value TH1 is determined as shown in FIG. 6, maximum points (portions surrounded by broken line circles in the figure) in a waveform above the threshold value TH1 are extracted.

The wheeze detector 44 sets the threshold value in the extraction condition to either the predetermined threshold value TH1 or a predetermined threshold value TH2. The threshold value TH2 is a value smaller than the threshold value TH1.

Figure 7:
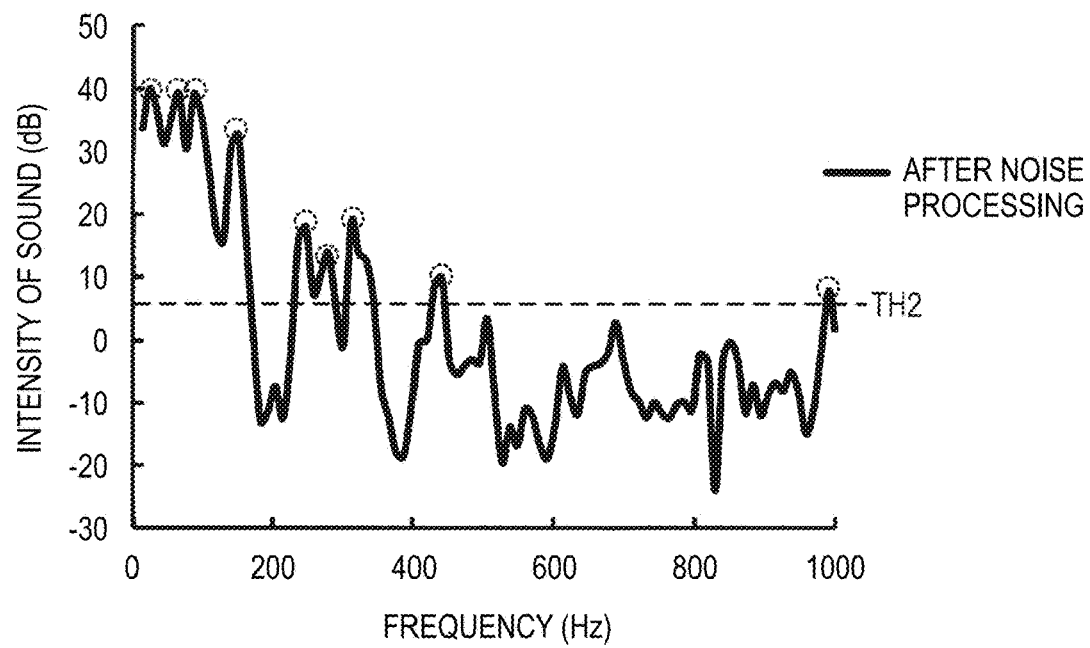
FIG. 7 is a view showing other example of a threshold value set for the pulmonary sound signal after noise removal.

For example, in the intensity distribution shown in FIG. 6, as shown in FIG. 7, in a case where the threshold value TH2 smaller than the threshold value TH1 in FIG. 6 is set, the number of maximum points to be extracted is increased by three as compared with the case where the threshold value TH1 is set.

For example, the wheeze detector 44 determines that wheeze is present in a case where the maximum points stored in the RAM includes one or a plurality of maximum points in a frequency range in which can be determined as the wheeze. Further, for example, the wheeze detector 44 determines whether the frame period, in which the maximum points having substantially the same frequency are extracted, is continuous a predetermined number of times in accordance with the information on the maximum points for each frame period stored in the RAM, and determines that wheeze is present in a case where such a frame period is continuous the predetermined number of times. Note that the wheeze determination processing using the information on the maximum points is not limited to the example illustrated here.

In this way, the wheeze detector 44 detects the wheeze based on the information on the maximum points extracted in accordance with the extraction condition described above. Therefore, between the case where the threshold value set in the extraction condition is set to the threshold value TH1 and the case where the threshold value set in the extraction condition is set to the threshold value TH2, the information on the maximum points used for the detection of the wheeze increases in the case where the threshold value is set to the threshold value TH2. As a result, the detection sensitivity of the wheeze increases.

The wheeze detector 44 sets the threshold value in the extraction condition to the threshold value TH1 in a case where the respiratory sound volume derived by the respiratory sound volume deriver 43 is within a predetermined specific range, and sets the threshold value in the extraction condition to the threshold value TH2 in a case where the respiratory sound volume derived by the respiratory sound volume deriver 43 is outside the above specific range. That is, in the case where the respiratory sound volume is outside the specific range, the wheeze detector 44 sets the detection sensitivity of the wheeze to a higher value than the detection sensitivity in the case where the respiratory sound volume is within the specific range.

As described above, the volume of respiratory sound and the wheeze depends on the body shape of the measurement subject such as a height, a body weight, or a BMI, a diameter or hardness of an airway of the measurement subject, or the like. In particular, in a case where the body weight or BMI is large, the respiratory sound and wheeze are less likely to be transmitted to a body surface, and therefore the respiratory sound and wheeze are also small, making detection difficult. When an asthma attack becomes severe, breathing becomes rough, and therefore the respiratory sound volume increases, making it difficult to detect the wheeze. Further, when the asthma attack becomes severe enough to cause respiratory failure, breathing becomes shallow and small, and therefore the respiratory sound and wheeze also become small, making it difficult to detect the wheeze.

That is, since it is difficult to detect the wheeze in a case where the respiratory sound volume is too large or too small, it is possible to prevent omission of detection of the wheeze by increasing the detection sensitivity of the wheeze in such a case. On the other hand, when the detection sensitivity of the wheeze is increased, a possibility that the wheeze is erroneously detected increases. Accordingly, it is necessary to increase the detection sensitivity of the wheeze only when the respiratory sound volume is large or small, which is a state where the wheeze is difficult to be detected, and in other cases, it is necessary to give priority to the detection accuracy of the wheeze and lower the detection sensitivity of the wheeze. The specific range described above is experimentally determined as a range excluding the range of the respiratory sound volume that makes it difficult to detect the wheeze.

Operation Example of Wheeze Detection Apparatus 1

Figure 8:
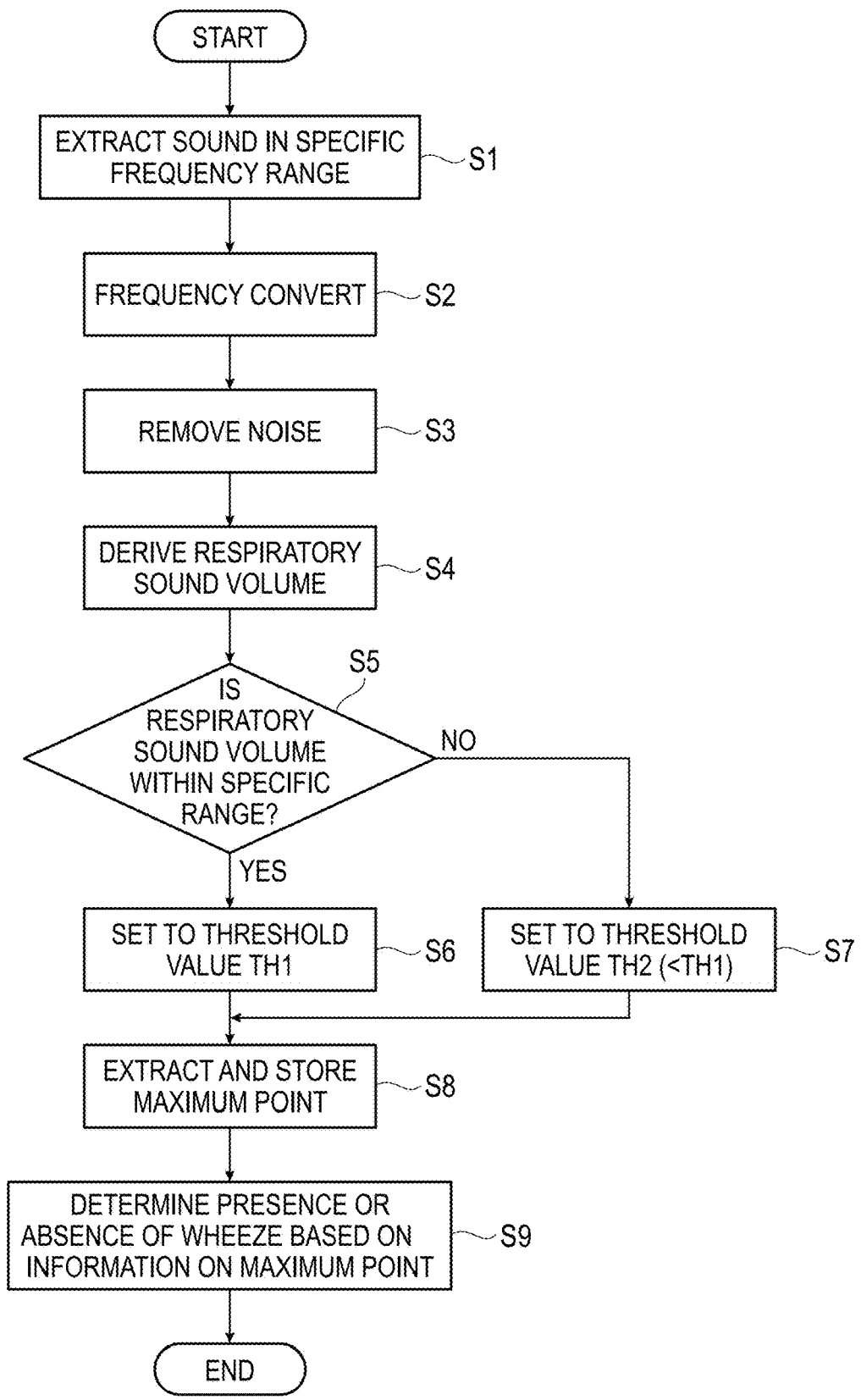
FIG. 8 is a flowchart for illustrating an operation example of the wheeze detection apparatus 1.

FIG. 8 is a flowchart for illustrating an operation example of the wheeze detection apparatus 1. When an instruction to start a wheeze detection processing is given, the integrated control unit 4 starts acquisition of the pulmonary sound signal from the first sound measuring instrument M1 and acquisition of the ambient sound signal from the second sound measuring instrument M2.

The preprocessing unit 40 of the integrated control unit 4 extracts the signal in the specific frequency range from the acquired pulmonary sound signal and ambient sound signal, and stores the extracted signal in the RAM (step S1).

When the pulmonary sound signal and the ambient sound signal for one frame period are stored in the RAM by the start of the process of step S1, the frequency conversion unit 41 performs frequency conversion of the pulmonary sound signal and the ambient sound signal for the one frame period (step S2).

Next, the noise removal unit 42 removes the noise component included in the pulmonary sound signal based on the ambient sound signal among the pulmonary sound signal and the ambient sound signal performed the frequency conversion in step S2 (step S3).

Next, the respiratory sound volume deriver 43 derives the respiratory sound volume of the measurement subject in the one frame period based on the pulmonary sound signal performed the frequency conversion in step S2 (step S4).

Next, the wheeze detector 44 determines whether the respiratory sound volume derived in step S4 is within the above specific range (step S5).

In the case where the wheeze detector 44 determines that the respiratory sound volume is within the specific range (step S5: YES), the wheeze detector 44 sets the threshold value in the extraction condition of the maximum point to the threshold value TH1 (step S6). In the case where the wheeze detector 44 determines that the respiratory sound volume is outside the specific range (the respiratory sound volume is larger than the specific range or the respiratory sound volume is smaller than the specific range) (step S5: NO), the wheeze detector 44 sets the threshold value in the extraction condition of the maximum point to the threshold value TH2 (step S7).

After step S6 or step S7, the wheeze detector 44 extracts maximum points in a range exceeding the threshold value set in step S6 or step S7 from the pulmonary sound signal after the noise component has been removed in step S3, and stores information on the extracted maximum points in the RAM (step S8).

Every time when the above predetermined period elapses after the process of step S2 is performed, the frame period is reset, and then the process of steps S2 to S8 is performed.

The wheeze detector 44 determines the presence or absence of the wheeze based on the information on the maximum points stored in the RAM by the process of steps S2 to S8 (step S9).

In a case where the wheeze detector 44 determines in step S9 that "wheeze is present", the wheeze detector 44 ends the sound measurement by the first sound measuring instrument M1 and the second sound measuring instrument M2, displays a detection result ("wheeze is present") on, for example, the display unit 6, notifies this, and ends the detection process.

Effects of Wheeze Detection Apparatus 1

As described above, according to the wheeze detection apparatus 1, in the case where the respiratory sound volume of the measurement subject is larger than the above specific range, the detection sensitivity of the wheeze is set to be higher than that in the case where the respiratory sound volume is within the above specific range. Accordingly, it is possible to increase the possibility that the wheeze is detected even in the state where the asthma attack becomes severe and breathing becomes rough.

According to the wheeze detection apparatus 1, in the case where the respiratory sound volume of the measurement subject is smaller than the above specific range, the detection sensitivity of the wheeze is set to be higher than the detection sensitivity in the case where the respiratory sound volume is within the above specific range. Accordingly, it is possible to increase the possibility that the wheeze is detected even in the state where breathing becomes shallow and small, such as a measurement subject who has caused a severe asthma attack or a measurement subject who has a large body weight or BMI.

According to the wheeze detection apparatus 1, in the case where the respiratory sound volume is within the above specific range, the detection sensitivity of the wheeze is set to be relatively low, so that it is possible to prevent erroneous detection of the wheeze and detect the wheeze with high accuracy.

Note that the wheeze detector 44 may change a magnitude of the threshold value TH2 set in the case where the respiratory sound volume is outside the specific range, in accordance with the respiratory sound volume. For example, in a case where the respiratory sound volume is larger than the specific range and larger than a first predetermined value, the wheeze detector 44 sets the threshold value TH2 to be smaller than the threshold value in a case where the respiratory sound volume is larger than the specific range and equal to or smaller than the first predetermined value.

In a case where the respiratory sound volume is smaller than the specific range and smaller than a second predetermined value, the wheeze detector 44 sets the threshold value TH2 to be smaller than the threshold value in a case where the respiratory sound volume is smaller than the specific range and equal to or larger than the second predetermined value. In this way, by setting the detection sensitivity in four or more stages, it is possible to optimize the ease of detection of wheeze in accordance with the magnitude of the respiratory sound volume. Accordingly, it is possible to prevent omission of detection of the wheeze with a higher probability.

In the flowchart of FIG. 8, before the process of steps S5 to S7 is performed, the wheeze detector 44 may extract the maximum point from the pulmonary sound signal after the noise removal in step S3. In this case, the wheeze detector 44 may perform the process of steps S5 to S7 after the extraction of the maximum points, exclude the maximum points in which the sound intensity is equal to or smaller than the threshold value TH1 or the threshold value TH2 among the maximum points extracted in advance, and store the maximum points in the RAM.

In the operation example of FIG. 8, the threshold value TH2 is set in step S7 in both the case where the respiratory sound volume is larger than the specific range and the case where the respiratory sound volume is smaller than the specific range. However, for example, when it is assumed that use of the wheeze detection apparatus 1 is not recommended for a person who has a shallow breathing, in the determination of step S5, the process of step S7 may be performed in the case where the respiratory sound volume is larger than the specific range, and the process of step S6 may be performed in the case where the respiratory sound volume is equal to or smaller than the maximum value in the specific range. Even in such a case, it is possible to increase the possibility that the wheeze is detected for the measurement subject who has a severe asthma attack and is rough in breathing.

Conversely, when it is assumed that the use of the wheeze detection apparatus 1 is not recommended for a person who is rough in breathing, in the determination of step S5, the process of step S7 may be performed in the case where the respiratory sound volume is smaller than the specific range, and the process of step S6 may be performed in the case where the respiratory sound volume is equal to or larger than the minimum value in the specific range. Even in such a case, it is possible to increase the possibility that the wheeze is detected for the measurement subject who has become shallow and small in breathing.

In addition, the above extraction conditions of the maximum point are not limited to those described above. For example, the wheeze detector 44 detects a maximum point and a minimum point from the pulmonary sound signal after the noise removal, and obtains a distance in a direction along the vertical axis from each detected maximum point to a straight line connecting two minimum points on both sides of the maximum point. Further, the extraction condition described above assumes that a maximum point at which the distance exceeds a threshold value th is extracted. In the case of this extraction condition, the wheeze detector 44 may set the threshold value th to a large first value in the case where the respiratory sound volume is within the specific range, and set the threshold value th to a second value smaller than the first value in the case where the respiratory sound volume is outside the specific range, so that the detection sensitivity of the wheeze is increased in the case where the respiratory sound volume is outside the specific range.

Modification of Wheeze Detection Apparatus 1

Figure 9:
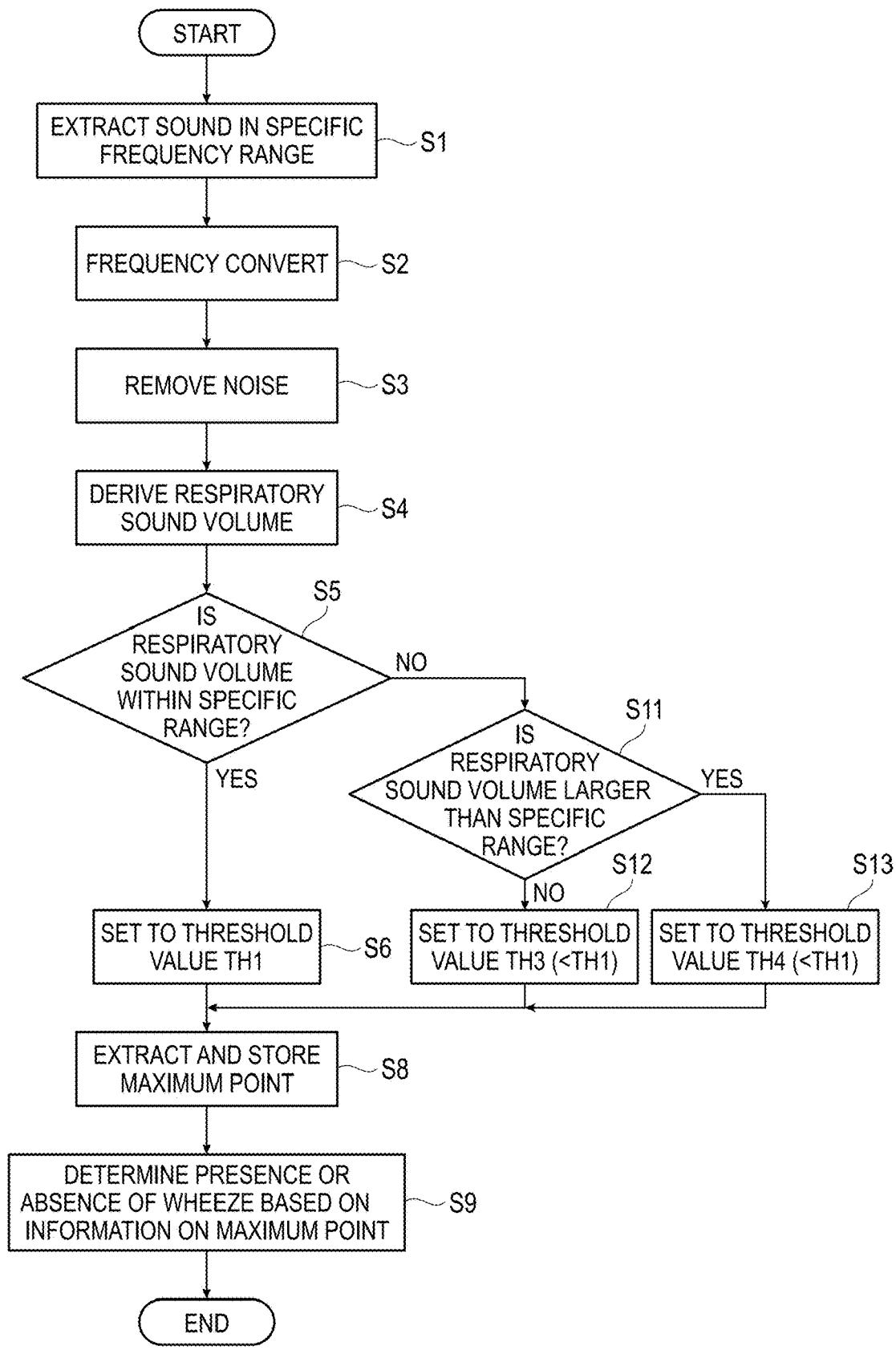
FIG. 9 is a flowchart for illustrating a modification of an operation of the wheeze detection apparatus 1.

FIG. 9 is a flowchart for illustrating a modification of an operation of the wheeze detection apparatus 1. The flowchart shown in FIG. 9 is the same as the flowchart shown in FIG. 8 except that step S7 is replaced with step S11, step S12, and step S13. In FIG. 9, the same process as those in FIG. 8 is denoted by the same reference sign, and the description thereof will be omitted.

In the case where it is determined in step S5 that the respiratory sound volume is outside the specific range (step S5: NO), the wheeze detector 44 further determines whether the respiratory sound volume is larger than the specific range (step S11). In the case where the wheeze detector 44 determines that the respiratory sound volume is smaller than the specific range (step S11: NO), the wheeze detector 44 sets a threshold value TH3 smaller than the threshold value TH1 as a threshold value in the extraction condition of the maximum point (step S12).

When the wheeze detector 44 determines that the respiratory sound volume is larger than the specific range (step S11: YES), the wheeze detector 44 sets a threshold value TH4, which is smaller than the threshold value TH1 and which is different from the threshold value TH3, as a threshold value in the extraction condition of the maximum point (step S13). After step S12 and step S13, the process of step S8 is performed.

As described above, according to the operation example of FIG. 9, the detection sensitivity is set to a value different between the case where the respiratory sound volume is small and the case where the respiratory sound volume is large. As a result, it is possible to optimize the ease of detection of wheeze in accordance with the magnitude of the respiratory sound volume, and it is possible to prevent omission of detection of the wheeze with a higher probability.

Other Modifications

The function of the integrated control unit 4 may be provided in an electronic device such as a smartphone, and the measurer 3 may be detachably attached to the electronic device. That is, a processor of the electronic device may function as the integrated control unit 4 by executing a wheeze detection program.

The second sound measuring instrument M2 is not essential and may be omitted. In a case where the second sound measuring instrument M2 is omitted, the noise removal unit 42 may be omitted, and in step S4 and subsequent steps in FIGS. 8 and 9, the processing may be performed on the pulmonary sound signal after the frequency conversion in step S2. In addition, the measurer 3 may not have the structure shown in FIG. 2 as long as the first sound measuring instrument M1 can measure the pulmonary sound.

Although various embodiments have been described above with reference to the drawings, it is needless to say that the present invention is not limited to these examples. It is apparent to those skilled in the art that various changes and modifications may be conceived within the scope of the claims, and it is understood that such changes and modifications also fall within the technical scope of the present invention. In addition, components in the embodiments described above may be combined freely within a range not departing from the spirit of the present invention.

What is claimed is:

1. A wheeze detection apparatus comprising:
a housing;
a display;
a microphone to measure a pulmonary sound of a measurement subject; and
a processor configured or programmed to define and function as:
a respiratory sound volume deriver to derive a respiratory sound volume of the measurement subject based on the pulmonary sound measured by the microphone; and
a wheeze detector to extract a maximum point from an intensity distribution for each frequency of the pulmonary sound and to detect wheeze based on information on the maximum point, wherein
the microphone is provided in an internal accommodation space of the housing, the internal accommodation space including an opening configured to be closed by the opening being pressed against a body surface of the measurement subject;
when the opening is pressed against the body surface of the measurement subject, the internal accommodation space is in a sealed state to prevent outside sound from being received by the microphone;
the wheeze detector determines whether the respiratory sound volume is equal to or greater than a first predetermined value and equal to or smaller than a second predetermined value that is greater than the first predetermined value;
when the wheeze detector determines that the respiratory sound volume is larger than the second predetermined value or smaller than the first predetermined value, the wheeze detector sets a detection sensitivity of the wheeze to a higher value than the detection sensitivity is set when the respiratory sound volume is equal to or greater than the first predetermined value and equal to or smaller than the second predetermined value; and
the display notifies a result of detection by the wheeze detector, the result showing whether or not the wheeze is present.

2. The wheeze detection apparatus according to claim 1, when the wheeze detector determines that the respiratory sound volume is smaller than the first predetermined value, the wheeze detector sets the detection sensitivity to a value different from a value to which the detection sensitivity is set when the respiratory sound volume is larger than the second predetermined value.

3. The wheeze detection apparatus according to claim 1, wherein the wheeze detector extracts the maximum point having an intensity exceeding a predetermined threshold value from the intensity distribution, detects the wheeze based on the information of the maximum point, and increases the detection sensitivity of the wheeze by decreasing the predetermined threshold value.

4. The wheeze detection apparatus according to claim 1, wherein
the respiratory sound volume is determined based on the pulmonary sound over a frame period.

5. The wheeze detection apparatus according to claim 1, wherein
the respiratory sound volume is determined based on a root mean square (RMS) amplitude of the pulmonary sound over a frame period.

6. A wheeze detection method for detecting wheeze of a measurement subject, comprising:
a respiratory sound volume deriving step of deriving a respiratory sound volume of the measurement subject based on a pulmonary sound measured by a microphone that measures the pulmonary sound of the measurement subject; and
a wheeze detecting step of extracting a maximum point from an intensity distribution for each frequency of the pulmonary sound and detecting wheeze based on information on the maximum point; and
a display step of notifying, on a display, a result of detection by the wheeze detecting step, the result showing whether or not the wheeze is present, wherein
in the wheeze detecting step, determining whether the respiratory sound volume is equal to or greater than a first predetermined value and equal to or smaller than a second predetermined value that is greater than the first predetermined value;
in the wheeze detecting step, when the respiratory sound volume is larger than the second predetermined value or smaller than the first predetermined value, a detection sensitivity of the wheeze is set to a higher value than the detection sensitivity is set when the respiratory sound volume is equal to or greater than the first predetermined value and equal to or smaller than the second predetermined value;
the microphone is provided in an internal accommodation space of a housing, the internal accommodation space including an opening configured to be closed by the opening being pressed against a body surface of the measurement subject; and
when the opening is pressed against the body surface of the measurement subject, the internal accommodation space is in a sealed state to prevent outside sound from being received by the microphone.

7. The wheeze detection method according to claim 6, wherein
the respiratory sound volume is determined based on the pulmonary sound over a frame period.

8. The wheeze detection method according to claim 6, wherein
the respiratory sound volume is determined based on a root mean square (RMS) amplitude of the pulmonary sound over a frame period.

9. A memory which stores a wheeze detection program configured to detect wheeze of a measurement subject, the program causing a computer to execute:
deriving a respiratory sound volume of the measurement subject based on a pulmonary sound measured by a microphone that measures the pulmonary sound of the measurement subject; and
extracting a maximum point from an intensity distribution for each frequency of the pulmonary sound and detecting wheeze based on information on the maximum point;
determining whether the respiratory sound volume is equal to or greater than a first predetermined value and equal to or smaller than a second predetermined value that is greater than the first predetermined value;
notifying, on a display, a result of the determining whether the respiratory sound volume is equal to or greater than a first predetermined value and equal to or smaller than a second predetermined value that is greater than the first predetermined value, the result showing whether or not the wheeze is present, wherein
when the respiratory sound volume is larger than the second predetermined value or smaller than the first predetermined value, a detection sensitivity of the wheeze is set to a higher value than the detection sensitivity is set when the respiratory sound volume is equal to or greater than the first predetermined value and equal to or smaller than the second predetermined value;

the microphone is provided in an internal accommodation space of a housing, the internal accommodation space including an opening configured to be closed by the opening being pressed against a body surface of the measurement subject; and when the opening is pressed against the body surface of the measurement subject, the internal accommodation space is in a sealed state to prevent outside sound from being received by the microphone.

10. The memory according to claim 9, wherein the respiratory sound volume is determined based on the pulmonary sound over a frame period.

11. The memory according to claim 9, wherein the respiratory sound volume is determined based on a root mean square (RMS) amplitude of the pulmonary sound over a frame period.

\* \* \* \* \*